July 22, 1958      R. E. BENN      2,844,028
APPARATUS FOR MEASURING DENIER
Filed May 26, 1955
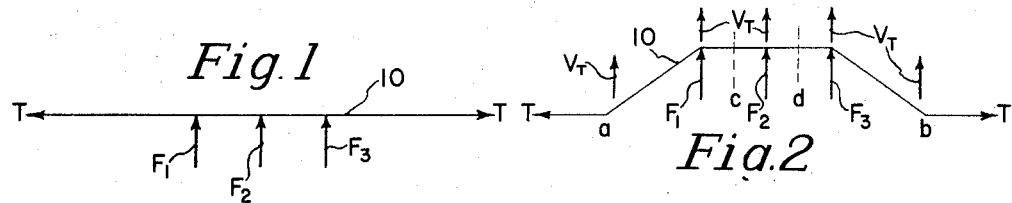
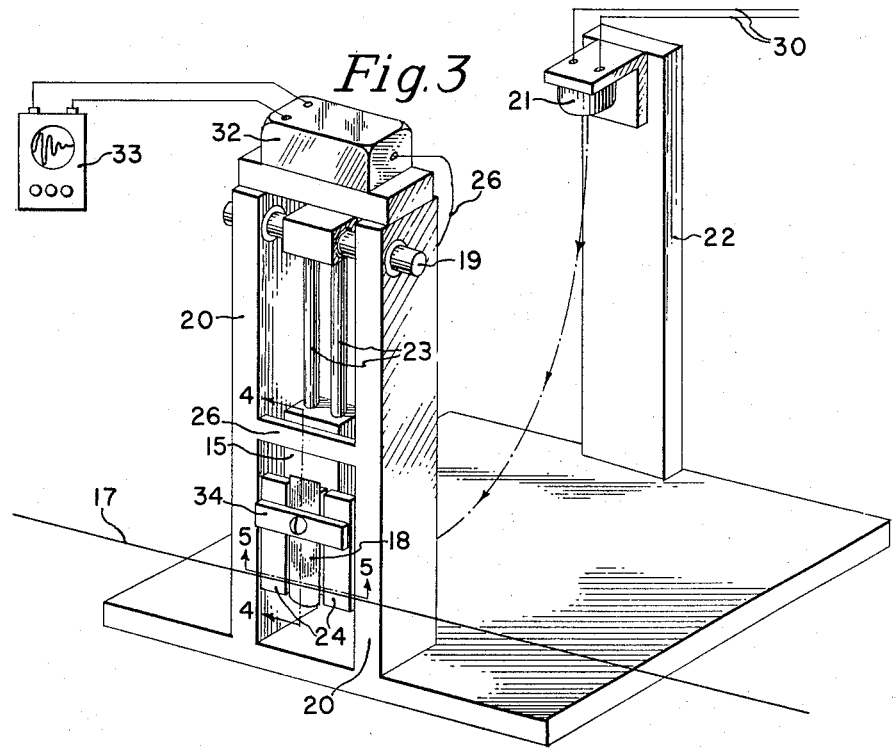
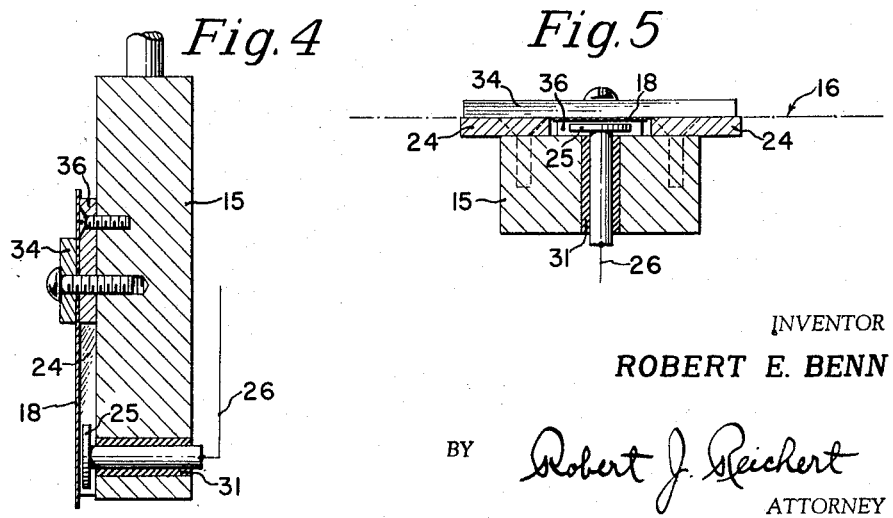
INVENTOR
ROBERT E. BENN
BY *Robert J. Reichert*
ATTORNEY United States Patent Office 2,844,028
Patented July 22, 1958

2,844,028

APPARATUS FOR MEASURING DENIER

Robert E. Benn, Broomall, Pa., assignor to E. I. du Pont de Nemours and Company, Wilmington, Del., a corporation of Delaware Application May 26, 1955, Serial No. 511,347

3 Claims. (Cl. 73—160)

This invention relates to apparatus for measuring the weight per unit length of cording or webbing while it is under tension.

In the manufacture of cording, such as yarn, thread and string, it is important that the weight per unit length be maintained relatively constant. Currently two methods are widely used to determine the weight per unit length, that is the denier, of cording. The most common method is to cut off and weigh a measured length of the cording, thereby determining the weight per unit length directly. An alternative method is to mount a length of the cording under tension and determine its resonant frequency of vibration. Knowing the resonant frequency of vibration of a given length of cording under a given tension, the denier of the cording can be computed.

Obviously both of these methods of determining the denier of cording are unsatisfactory because they require the stopping of the manufacture of the cording. The method whereby the denier is determined by weighing a length of the cording has the additional disadvantage of causing a break in the yarn.

I have discovered an improved apparatus for ascertaining the weight per unit length of cording or webbing, which requires neither the cutting of a length of the cording or webbing nor the measuring of the frequency of vibration of a mounted segment. This apparatus can be used to determine the weight per unit length of cording or webbing while it is under tension on the manufacturing apparatus.

The operation of my apparatus for measuring the denier of cording while it is under tension comprises striking the cording with a displaceable member that at the instant of contact with the cording is moving rapidly relative to the cording at a predetermined velocity transsersely to the line or plane of the cording or webbing. Upon contact, or impact, with the displaceable member, the cording is accelerated rapidly until the cording and the displaceable member have the same transverse velocity. While the displaceable member is in contact therewith, the cording adjacent the displaceable member is maintained substantially straight.

The cording in being accelerated by the displaceable member exerts a force against it. This force is directly proportional to the weight of the length of the cording being accelerated by the displaceable member and is independent of the tension on the cording. The measurement of this force can be taken directly in units of the weight per unit length, that is the denier, of the cording.

To explain the underlying theory of my invention, reference is made to Figures 1 and 2 of the drawings. Figure 1 illustrates a cording 10 at the instant of simultaneous application of coplanar forces $F_1$, $F_2$ and $F_3$. The cording 10 is under tension in the direction of its length, as is indicated by the letter T. The forces $F_1$, $F_2$ and $F_3$ are applied transversely to the cording 10. At the instant of contact with the cording the plane of these forces is moved at a predetermined transverse velocity $V_T$.

Figure 2 illustrates the same cording 10 at some instant after the simultaneous application of forces $F_1$, $F_2$ and $F_3$ to the cording. $F_1$, $F_2$ and $F_3$ have been maintained substantially coplanar and the cording between points $c$ and $d$, that is adjacent $F_2$, has been maintained substantially straight by having the spaces between $F_1$, $F_2$ and $F_3$ small. The cording is being accelerated to a transverse velocity $V_T$ equal to the velocity of the plane of the three forces.

Forces $F_1$ and $F_3$ are now opposed by the tension force in the cording and also by the inertial forces arising at the corners $a$ and $b$ where the disturbance is being propagated along the cording. However, since $F_1$, $F_2$ and $F_3$ have been maintained substantially coplanar and the cording substantially straight, $F_2$ is opposed neither by tension in the cording nor by the inertial forces at $a$ and $b$, $F_1$ and $F_3$'s prime function being to isolate $F_2$ from all tensional forces and from the inertial forces at $a$ and $b$. Therefore, as soon as the cording adjacent $F_2$ has been accelerated to a velocity equal to the velocity of the forces, $F_2$ will have no opposing force, and will thereafter necessarily be zero as long as it remains coplanar with $F_1$ and $F_3$.

Force $F_2$ does have a value other than zero, however, during the period of time that the cording adjacent it is being accelerated transversely. During this acceleration period, $F_2$ must accelerate transversely that portion of the cording between point $c$ and $d$ from a zero transverse velocity to the transverse velocity of the forces $V_T$. Points $c$ and $d$ are halfway between the points of application of the forces.

Thus during acceleration of the length of cording between points $c$ and $d$, $F_2$ is opposed only by the inertial force of the cording between points $c$ and $d$. The magnitude of this inertial force is equal to the product of the mass of the cording between points $c$ and $d$ and the acceleration of the cording. As long as the forces $F_1$, $F_2$ and $F_3$ are maintained coplanar and the cording between the forces is maintained substantially straight while accelerating the cording, $F_2$ is equal to this inertial force and is independent of tensional forces.

Since the final transverse velocity of the cording accelerated by $F_2$ equals $V_T$, which is fixed and known, the magnitude of $F_2$ while it is accelerating the cording obviously is directly and linearly proportional to the mass of the cording between points $c$ and $d$. Therefore the measurement of $F_2$ can be made directly in terms of mass per unit length of the cording.

Many types of apparatus can be used in the practice of the method of my invention. Typical of such apparatus is that shown in Figures 3 thru 5 of the drawings, wherein Figure 3 is a perspective view of the apparatus in operation; Figure 4 is a vertical section of the striker head taken along line 4—4 on Figure 3; and Figure 5 is a horizontal section of the striker head taken along line 5—5 on Figure 3.

This apparatus for measuring the denier of cording under tension comprises a striker head 15 mounted by means of arms 23 as a pendulum swinging freely with pin 19, the striker face being perpendicular to the pendulum arc. Pin 19 is journaled in ball bearings and is supported by upright supports 20. In operation the striker head strikes bumper 26, thereby arresting the forward motion of the striker head shortly after it strikes the cording.

Electro magnet 21, mounted on upright 22, is located so that it is in the arcuate path of movement of the striker head. Electric leads 30 connect the magnet to a source of direct electric current, not shown. The position of magnet 21 in the arcuate striker head path controls the velocity at which the striker head contacts the cording 17—thus, magnet 21 functions as a means for causing relative transverse movement between the cording and the striker head so that the striker face contacts the cording at a predetermined velocity. That is, the cutting off the electric current to magnet 21 releases the striker head from a fixed horizonal rest position, so that it accelerates gravitationally to a specific velocity by the time it strikes the cording 17.

The striker head 15 comprises a planar striking face 16 (see Figure 5), which is that face of the striker head that comes in contact with the cording. The striker face has a vibratory displaceable member 18 positioned generally centrally therein. The outer surface of the vibratory displaceable member 18 constitutes part of the striking face 16. The vibratory displaceable member can be any relatively stiff, flexible elastic material such as band spring steel. It has a mass many times greater, preferably 100 fold or more, than the mass of the section of cording that it is designed to accelerate. It is mounted by means of bars 34 and 36 on the striker head in a fixed location but is free to vibrate perpendicular to the striker face upon the application of a force against it.

The striker face also comprises rigid isolating means such as shoulders 24 positioned so that their outer planar faces are coplanar with the vibratory displaceable member and so in the plane of the striker face. The isolating means are in a fixed position closely adjacent to and outwardly of the vibratory displaceable member at all points or regions where the vibratory displaceable member contacts the cording. Bars 34 and 36 screwed to the striker head hold the vibratory displaceable member and the isolating means in place.

Means for measuring the amplitude of displaceament of the vibratory displaceable member is provided. This means comprises a variable capacitor, the capacitance of which varies with deflection of the vibratory displaceable member. The vibratory displeaceable member 18 is one plate and is at "ground" potential by being bolted directly to the metal striker head. Fixed plate 25 is the other plate of the capacitor. It is electrically insulated from "ground" by insulating bushing 31. Electrical lead 26 connects plate 25 of the capacitor to a conventional capacitance measuring device 32. This device 32 delivers a signal voltage proportional to the capacitance of the variable capacitor to the oscilliscope 33. The oscilliscope is set to have its horizontal sweep begin when the vibratory displaceable element strikes the cording. A visual indication of the capacitance change, measured in volts, is thereby provided.

To measure the denier of a cording 17 while it is under tension, the apparatus shown in Figures 3 thru 5 is placed so that the striker head 15 will strike the cording 17 in a transverse direction, preferably perpendicular to the cording, when the striker head pendulum is in a generally vertical position. The striker head is then drawn back to the horizontal rest position and held there by energizing the electro magnet 21. When the operator desires to make a measurement, he merely cuts the current to the electro magnet so that it releases the striker head pendulum. The striker head is thereby caused to move so that the striker face forcibly strikes the cording at a transverse velocity predetermined by the position of magnet 21.

Upon being struck by the striker face of the striker head, the cording is accelerated rapidly to the transverse velocity of the vibratory displaceable member. Because the vibratory member has a much greater mass than does the cording that is being accelerated by the vibratory member, the velocity of the vibratory member remains substantially the same as the velocity of the isolating means during the acceleration of the cording, although of course it does decrease slightly.

The cording exerts tensional and inertial forces against the isolating means or shoulders 24, which function as forces $F_1$ and $F_3$ of Figures 1 and 2. Thus the isolating shoulders effectively isolate the vibratory displaceable member from the tensional forces in the cording and also the inertial forces at points $a$ and $b$, because the isolating shoulders contact the cording coplanar with and outwardly on either side of the vibratory member.

While the vibratory member is in contact with the cording, the section of cording that is being accelerated by the vibratory member is maintained substantially straight. This is assured by having the vibratory member and the isolating shoulders coplanar and the distances between the vibratory member and the isolating shoulders relatively small. Of course, the cording does not remain exactly straight since it deflects the vibratory member slightly.

During the time that the cording is being accelerated from a zero transverse velocity to a transverse velocity equal to that of the vibratory member, the vibratory member is opposed substantially only by the inertial force of the cording extending from halfway between one measuring shoulder 24 and the vibratory member 18 to halfway between the other measuring shoulder 24 and the vibratory member.

The inertial force against the vibratory member causes it to vibrate at an initial maximum amplitude proportional to the magnitude of the inertial force. This magnitude is measured by determining the change in capacitance between the vibratory member and the fixed capacitor plate during the first swing of the vibratory member towards the capacitor plate.

The wave pattern of the capacitance change, the maximum amplitude of which is directly and linearly proportional to the denier of the string, is recorded on the oscilloscope. By first calibrating maximum capacitance changes for cords of known denier, a scale or index is made up so that the maximum change in capacitance is thereafter measured directly in terms of mass per unit length, or denier.

Typical of the results to be obtained when using my method and apparatus are the readings given in the table below. These readings were made on multiple filament cellulose acetate yarn of known denier under known tension using apparatus substantially similar to that shown in the drawings. The readings in millivolts were taken visually from the oscilloscope, tnd represent the peak value of the first one-half cycle of vibration of the vibratory member 18.

| Tension in grams | 30 | 60 | 120 |
|---|---|---|---|
| Denier: | Mv. | Mv. | Mv. |
| 300 | 98.5 | 98.5 | |
| 600 | | 190.8 | 188 |

As can be seen with this particular apparatus the scale of calibration for the oscilloscope was approximately 1 millivolt to 3 denier. Having determined this scale, the denier of other yarns could be made readily.

The data of the above table show that in my method the denier measurements are substantially independent of the tension in the cording. They also show that the deflection of the vibratory member is substantially linearly proportional to the denier of the cording.

Numerous modifications of the above-described apparatus can be made. For example, the striker head need not be mounted as a pendulum. It can be mounted so that its movement is in a straight line rather than arcuate, with mechanical power being used to impel the striker head against the cording.

Likewise numerous means for measuring the deflection of the displaceable member can be employed. For example, instead of a variable capacitor, an impedance that is varied by deflection of the displaceable member can be used. Alternatively, magnetic, optical or pneumatic means for recording the deflection of the displaceable member can be used. In all of these measuring means the displacement of the displaceable member is recorded electrically as units of capacitance change, impedance change, and the like.

While my invention has been described specifically in reference to measuring the denier of cording, it can be used to measure the weight per unit length or area of numerous materials. For example, it can be used to measure the mass per unit length or area of various types of yarn, threads, flexible cording of various types, flexible wire, cloth, woven and felted textile fabrics, flexible plastic films, paper, filamentary glass fiber and fabrics, and numerous other thin flexible materials of substantial length.

With materials such as fabrics having large widths as well as lengths, it is necessary to use apparatus wherein the displaceable member is completely surrounded by the isolating means so that the displaceable member is isolated from tensional forces. One type of apparatus that has been used successfully in measuring the weight per unit area of flexible plastic film comprises a striker face having a circular isolating means and a metallized plastic film vibratory displaceable member connected throughout its periphery to the isolating means. The metal surface of the vibratory displaceable member acted as the movable plate in a variable capacitor.

My apparatus is applicable to measuring the denier of material whether in motion or stationary. Where the cording or the like is in motion, the measuring apparatus can be mounted so as to move parallel to the cording at a speed equal to the speed of the cording. This of course eliminates any relative motion between the cording and the apparatus (other than the motion of the striker head). However, it is not necessary to do this, since highly satisfactory results are obtainable on moving material using stationary apparatus of my invention. Of course, it is essential that the material being accelerated transversely by the displaceable member be maintained substantially straight. Furthermore, the duration of the contact between the displaceable member and the cording preferably is extremely short when the cording is moving rapidly with respect to the apparatus, particularly if the surface of the cording is not smooth.

Since my apparatus can be modified in numerous ways without departure from the spirit of my invention, it is intended to be limited only by the following claims.

This application is a continuation in part of my copending application, U. S. Serial No. 503,998, filed April 26, 1955 and now abandoned.

I claim:

1. Apparatus for measuring the denier of cording as a function of displacement amplitude comprising, in combination, (1) a striker head having (a) a planar striker face comprising (i) a displaceable member mounted on the striker head so as to be displaceable in a direction perpendicular to the striker face and (ii) rigid isolating means in a fixed position coplanar with and adjacent the outer edges of the displaceable member at all regions of contact of the displaceable member with the cording; (2) means for causing relative transverse motion at a predetermined velocity between the cording and the striker head so that on contact with the striker face the cording can move the displaceable member relative to the isolating means perpendicular to the striker face; and (3) means for measuring the amplitude of displacement of said displaceable member.

2. Apparatus for measuring the weight per unit length of cording as a function of vibration amplitude comprising, in combination (1) a striker head having (a) a planar striker face comprising (i) a vibratory displaceable member mounted on the striker head so as to be free to vibrate in a direction perpendicular to the striker face and (ii) rigid isolating means in a fixed position coplanar with and adjacent the outer edges of the vibratory displaceable member at all regions of contact of the vibratory displaceable member with the cording; (2) means for causing relative transverse motion at a predetermined velocity between the cording and the striker head so that on contact with the striker face the cording can move the displaceable member relative to the isolating means perpendicular to the striker face; and (3) means for measuring the amplitude of displacement of said vibratory displaceable member.

3. Apparatus for measuring the weight per unit length of cording as a function of vibration amplitude comprising in combination (1) a striker head comprising (a) a striker face having (i) a vibratory displaceable member coplanar therein mounted on the striker head so as to be free to vibrate in a direction perpendicular to the striker face and (ii) rigid isolating means in a fixed position coplanar with and adjacent the outer edges of the vibratory displaceable member at all regions of contact of the vibratory displaceable member with the cording; (b) a variable capacitor, the capacitance of which varies with movement of the vibratory displaceable member, caused by striking the cording and (2) means for moving the striker head so that its striker face strikes the cording at a predetermined velocity in a direction perpendicular to the cording; and (3) means for measuring the changes in capacitance of said variable capacitor.

References Cited in the file of this patent

UNITED STATES PATENTS

| | | |
|---|---|---|
| 1,913,120 | Kenyon | June 6, 1933 |
| 2,068,036 | Orling | Jan. 19, 1937 |
| 2,278,510 | Condon | April 7, 1942 |
| 2,623,636 | Pounds | Dec. 30, 1952 |